(12) United States Patent
Donahue et al.

(10) Patent No.: US 6,266,231 B1
(45) Date of Patent: *Jul. 24, 2001

(54) POWER BLOCKING CIRCUIT BREAKER LOCKING DEVICE

(75) Inventors: Thomas Warren Donahue, Midway; Wilburn Dale Myers, Huntsville, both of TX (US)

(73) Assignee: Safety Design, Inc., Huntsville, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/271,017

(22) Filed: Mar. 15, 1999

Related U.S. Application Data

(60) Provisional application No. 60/079,074, filed on Mar. 23, 1998.

(51) Int. Cl.[7] .............................. H02B 1/18; H01H 9/28
(52) U.S. Cl. .................. 361/631; 200/43.14; 200/43.11; 200/43.16; 70/DIG. 30
(58) Field of Search .................. 70/DIG. 30; 200/43.11, 200/43.14–43.19, 43.21–43.22; 300/631, 634–636, 647, 652–656, 673

(56) References Cited

U.S. PATENT DOCUMENTS

| 5,270,503 | * | 12/1993 | Frye ................................. 200/43.14 |
| 5,794,760 | * | 8/1998 | Alexander ......................... 200/43.14 |
| 5,900,600 |   | 5/1999 | Alexander et al. ............... 200/43.14 |

OTHER PUBLICATIONS

Portions of Stranco, Inc. Catalog (believed to be published at least as early as May 1995), reference # RP595, particularly p. D–5.

Product Sheet for Breaker Lock™ by Toloc Systems, Inc., (believed to be published at least as early as May 1995) particularly Item PK–H.

* cited by examiner

*Primary Examiner*—Gregory Thompson
(74) *Attorney, Agent, or Firm*—Howrey Simon Arnold & White LLP

(57) ABSTRACT

A circuit breaker lock-out device is disclosed, the lock-out device including a U-shaped channel member with a plurality of closed slots paired opposite one another in the side walls of the channel. The device includes lock-out bars comprising a notched stem transversely aligned with the channel member to immobilize a circuit breaker switch in either the "OFF" or "ON" position as desired. The bars are "locked" in position with a padlock or closed-door padlockable bar, immobilizing the circuit breaker switch.

28 Claims, 4 Drawing Sheets

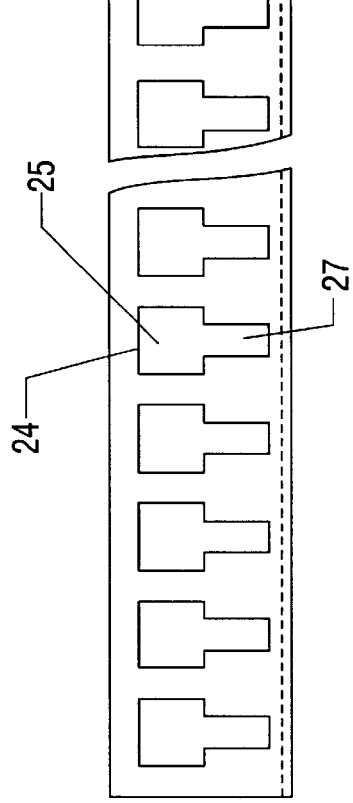
FIG. 2
FIG. 3
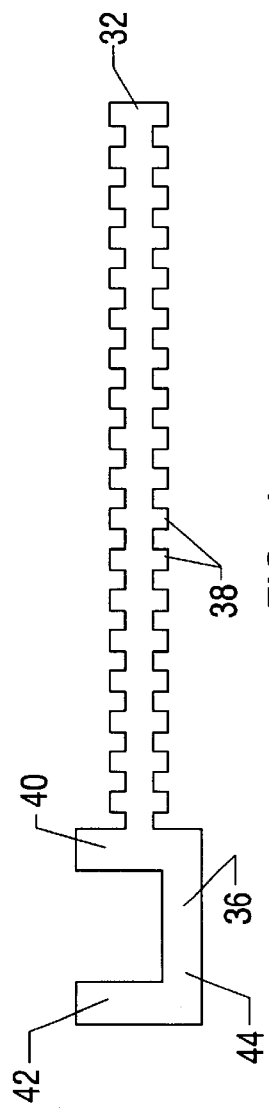
FIG. 4
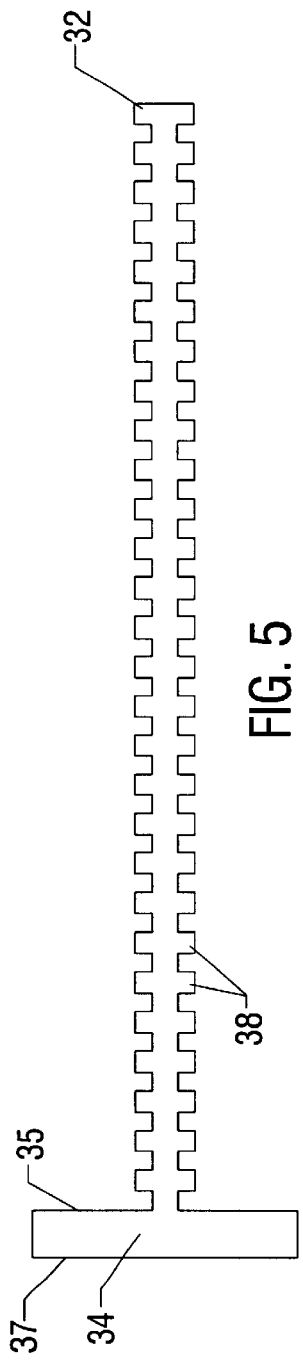
FIG. 5

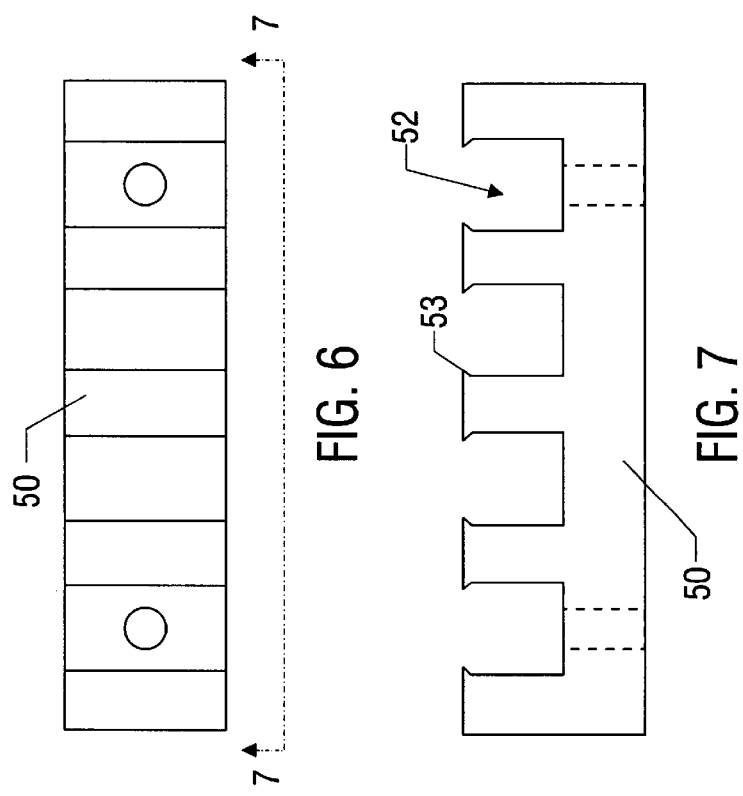

POWER BLOCKING CIRCUIT BREAKER LOCKING DEVICE

This application claims priority from Provisional Application Ser. No. 60/079,074 filed Mar. 23, 1998.

FIELD OF THE INVENTION

This invention relates generally electrical circuit breakers, and, more particularly to safety devices for locking an electrical circuit breaker in the open or closed position.

BACKGROUND OF THE INVENTION

Safety concerns in relation to industrial service and maintenance operations have heightened in recent years. Federal and state regulations have been promulgated and implemented to increase occupational safety in the work place. Compliance with the regulations including the OSHA Standard 29 CFR 1910.147 requires that certain actions be taken to assure that machinery is safe to operate during normal operation and that machinery is isolated from any energy sources during maintenance or repair.

OSHA Standard 29 CFR 1910.147 requires that employers safeguard workers by locking and tagging out energy sources during maintenance and servicing operations. The purpose of locking out the energy source to the machinery or apparatus is to prevent accidental re-energization of the equipment when servicemen are in a compromised position in relation to the machinery or apparatus. Energization or operation of the equipment during service may result in serious injury or death. The regulations prescribe precautions to be taken during service or maintenance to insure that the energy sources for machinery are positively inactivated.

The locking out of energy sources to machinery and equipment when they are being serviced or maintained is accomplished with a number of devices that attempt, for example, to lock-out switches of circuit breaker boxes. These devices are intended to prevent the switches from being switched from the "OFF" position to the "ON" position and possibly injuring someone during service or maintenance of equipment associated with the circuit breaker.

Many of the current devices, while satisfying the literal requirement of the government regulations which apply, are limited in use by certain practical considerations. For example, most devices cannot lock-out individual circuit breaker switches without tripping adjacent switches, which may cause an undesirable interruption of service to the machinery or equipment associated with the adjacent switches. By further example, some devices are only useful for breaker boxes of certain manufacturers' panels, often resulting in numerous different lock-out devices at a single installation site. Other difficulties are common to devices that will only lockout switches a predetermined distance from the device, and lock-out devices that are difficult to install or require time consuming specialized training to operate. In addition, it is sometimes desirable to close the panel door to a circuit breaker box after locking out one or more switches, and many of the bulky devices and padlocks do not allow for this.

There are also circumstances under which it may be desirable to lock a circuit breaker "ON" to prevent accidental power failures to critical machinery, equipment, or systems. For example, it may be desirable to lock-on the power supply to particular security systems, computers, or lighting. Many of the typical lock-out devices do not accommodate both lockingon and locking-off with the same safety device.

There is a need for a circuit breaker lock-out device that is simple to use, provides maximum protection to servicepeople, fits any manufacturer's circuit breaker panels, can lock-out circuit breakers in either the "OFF" or "ON" position, will lock-out indefinite lengths, and is easily installable.

The present invention is directed to overcoming, or at least reducing the effects of, one or re of the issues set forth above.

SUMMARY OF INVENTION

In accordance with one aspect of the present invention, a circuit breaker lock-out device is provided. The lock-out device includes a generally U-shaped channel with a plurality of closed slots formed in two opposing sides of the channel. The device also includes lock-out bars to immobilize a circuit breaker switch in either the "OFF" or "ON" position as desired. The bars engage the slots and when used to immobilize a circuit breaker in the "OFF" position are "locked" in position by a conventional padlock or a closed-door padlocked bar.

BRIEF DESCRIPTION OF THE DRAWINGS

The foregoing and other features and aspects of the invention will become further apparent upon reading the following detailed description and upon reference to the drawings in which:

FIG. 2 is a cross section of the U-shaped channel of the Power Blocking Circuit Breaker Locking Device shown in FIG. 1;

FIG. 3 is a side view of the U-shaped channel of the Power Blocking Circuit Breaker Locking Device shown in FIG. 1;

FIG. 4 is a top view of one embodiment of the locking-bars;

FIG. 5 is a top view of another embodiment of the locking-bars;

FIG. 6 is a top view of the locking-bar holder;

FIG. 7 is a side view of the locking-bar holder as seen in the direction of section line 7—7 of FIG. 6.

FIG. 8 is a top view of the closed-door padlockable insert.

FIG. 9 is a side view of the closed-door padlockable insert as seen in the direction of section line 9—9 of FIG. 8.

FIG. 10 is an end view of the closed-door padlockable insert as seen in the direction of section line 10—10 of FIG. 9.

FIG. 11 is a cross section of an alternative embodiment of the channel.

Figure 1:
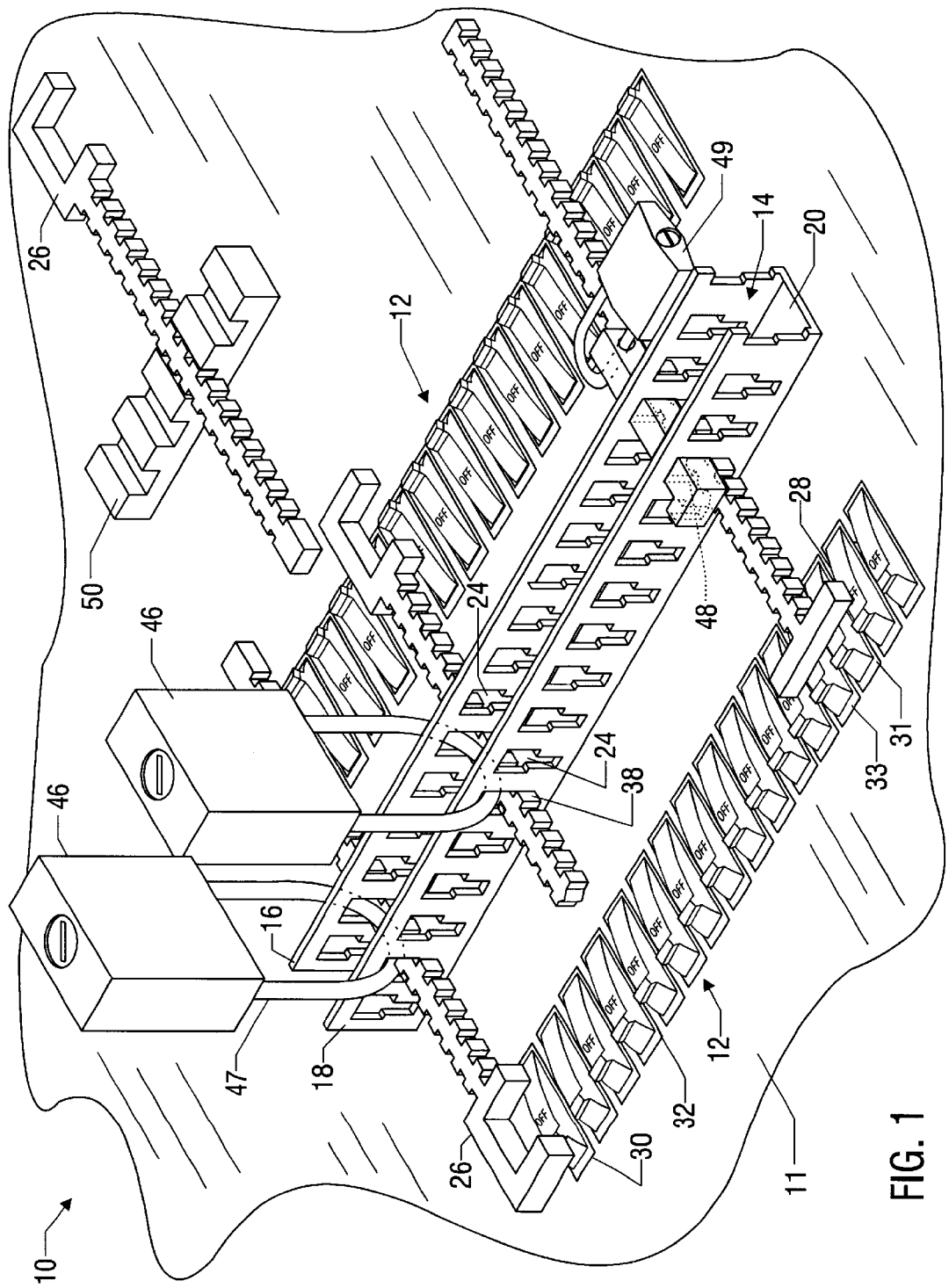
FIG. 1 is a perspective view of the Power Blocking Circuit Breaker Locking Device and panel with locking bars in place locking out a series of switches.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and in particular to FIG. 1, one embodiment of the present invention is disclosed. Lock-out device 10 is shown in FIG. 1 with an adjacent bank 12 of toggle switches used in a circuit breaker panel box 11. Lock-out device 10 includes an open U-shaped channel 14. Channel 14 exhibits a long axis and includes a pair of spaced, opposed, side walls 16 and 18 in conjunction with a channel base 20. Channel 14 may comprise aluminum, stainless steel, plastic, or some other compatible material. In one embodiment, side walls 16 and 18 may be spaced approximately a ½ inch apart by channel base 20 to provide sufficient strength and rigidity to the channel in anticipation of receiving a locking bar 26 or 28 into slots 24 (discussed below), while continuing to accommodate locking out a series of tightly-spaced breakers. It has been found that a channel width of ½ inch will fit adjacent the rows of breaker switches in most manufacturers' circuit breaker panels.

Opposing walls 16 and 18 extend the entire longitudinal length of channel 14. In one embodiment, channel 14 comprises single-piece construction, advantageously shaped into the configuration shown in FIG. 1 with channel base 20 and side walls 16 and 18. Channel base 20 may be attached to bank 12 with screws, rivets, adhesive, or other fasteners known in the art. As one example, 3M DP805 adhesive may be used. Channel base 20 can easily be attached to bank 12, without requiring removal of the panel cover after installation of channel base 20, if adhesive is used for installation.

Opposing side walls 16 and 18 each meet channel base 20 substantially perpendicularly, i.e. each side extends normal to the plane of channel base 20 a finite distance. In single-piece construction, side walls 16 and 18 and are bent to a position substantially perpendicular to channel base 20. In one embodiment sides 16 and 18 are substantially planar along the entire dimension normal to channel base 20. In another embodiment side 18 only extends normal to channel base 20 a portion of its substantially perpendicular dimension. In this embodiment, wall 18 exhibits an angular bend 22 away from the plane substantially perpendicular to channel base 20. Angular bend 22, which in a preferred embodiment is a 16° bend, is shown in the cross sectional view of channel 14 in FIG. 2. The tendency of bend 22 is to bring the free longitudinal edge of side 18 into closer dimensional proximity to the free longitudinal edge of side 16.

Side wall 18 may be substantially equal in width to side wall 16 such that the plane extending through the free longitudinal edges of sides 16 and 18 is not parallel to channel base 20 due to angular bend 22 exhibited in side 18. In an alternative embodiment, side 18 is slightly wider in the substantially perpendicular direction to channel base 20 than side 16 such that the plane extending through the free longitudinal edges of sides 16 and 18 is parallel to channel base 20.

FIGS. 1 and 3 show that side walls 16 and 18 each exhibit a plurality of enclosed slots or passages 24 having an upper section and a lower section, transversely aligned along a longitudinal axis of channel 14 in complementary pairs. In one embodiment at least one of the sides exhibits a plurality of T-shaped slots or apertures. FIGS. 1 and 3 show side walls 16 and 18 both with T-shaped apertures, but in an alternative embodiment one of the two sides exhibits rectangular passages. In a preferred embodiment slots 24 are substantially the same in configuration in both sides 16 and 18. Each slot 24 of side 16 is paired with a slot from side 18. A pair of slots 24 are receptive of a locking bar 26 or 28. FIG. 1 shows a plurality of locking bars or locking members 26 and 28 disposed within slots 24 of sides 16 and 18. The locking bars 26 and 28 are in effect circuit breaker keepers, in that they provide the connection between the channel base 20 and the series of circuit breakers.

A larger rectangular dimension 25 of slot 24, i.e. the upper section or rectangular portion 5 of the slot nearest the free longitudinal edge of sides 16 and 18 shown in FIG. 3, enables notched bar 26 or 28 to enter slot 24 in a direction transverse to channel 14. A smaller rectangular dimension 27 of T-shaped slot 24, i.e. the lower portion of slot 24 nearest channel base 20, facilitates the locking of bars 26 and 28 into a fixed transverse position. Larger rectangular dimension 25 of slot 24 is also receptive of a padlock 46, for example a ¼ inch American Series 1105 padlock or a closed door padlockable insert 48, both of which prevent locking bars 26 and 28 from disengaging smaller rectangular dimension 27 of slots 24. The purpose of angular bend 22 is to facilitate the allowance of a shank 47 of padlock 46 to negotiate a path through both slots 24 of sides 16 and 18 to the position shown in FIG. 1 with the U-portion of shank 47 adjacent to bar 26 or 28 without decreasing the distance between walls 16 and 18 and thus compromising the stability of bars 26 or 28 engaged therewith.

It will be understood that the number of paired passages or slots 24 formed in walls 16 and 18 of channel 14 is at least equal to the number of switches 30 in bank 12 of a circuit breaker box, with the spacing of the slots corresponding to the spacing of the switches. Thus, the spacing of the apertures 24 facilitates locking out each circuit breaker switch simultaneously, if necessary, by installing an appropriate number of locking bars. The spacing also facilitates locking out each individual circuit breaker switch without disturbing adjacent switches.

In an alternative embodiment, channel 14 is of lower profile to accommodate circuit breaker boxes with a shallow recess. In this alternative embodiment side walls 16 and 18 are shorter in the direction perpendicular to channel base 20 and both walls exhibit angular bends 22, for example a 10° angle as shown in FIG. 11. Double angular bends 22 become necessary when it is desirable to allow shank 47 of padlock 46 to negotiate through slots 24 of shorter sides 16 and 18 to a position shown in FIG. 1 with the U-portion of shank 47 adjacent to bar 26 or 28 without decreasing the distance between walls 16 and 18 and thus compromising the stability of bars 26 or 28 engaged therewith.

The embodiment of bar 26 shown in FIG. 4 includes a notched longitudinal stem 32 and a C-shaped 36 end section. Bar 26, also referred to as a circuit breaker keeper, may be constructed of aluminum, stainless steel, plastic, or other materials known in the art which are sufficient for use in the intended application. A plurality of notches 38 extending from only two opposing sides are spaced along stem 32 so as to facilitate engagement of the notches with slots 24 of both sides 16 and 18 simultaneously. Stem 32 may be any desirable length enabling bar 26 to extend to and lock-out a switch 30. Notches 38 are dimensioned such that as they engage slots 24, bar 26 is precluded from transverse movement relative to channel 14. In other words, the locking members 26 and 28 are adapted to resist lateral movement across channel 14. Stem 32 of bar 26 enters channel 14 through the larger dimensional rectangle 25 of slot 24, and may move toward channel base 20 to engage notches 38 with smaller rectangular dimension 27. Once notches 38 of stem 32 engage slot 24, transverse movement of bar 26 is precluded.

C-shaped locking bar 26 exhibits three sides comprising the "C"; side 40, side 42, and side 44. Side 40 of bar 26 attaches perpendicularly with one end of stem 32, side 42 is opposite and substantially parallel to side 40, and side 44 connects perpendicularly with both side 40 and side 42. C-shaped locking bar 26 facilitates locking a single switch 30 in either the "ON" or "OFF" position. C-shaped locking bar 26 may be arranged so as to enclose switch 30 on three sides.

The embodiment of bar 28 shown in FIG. 5 includes a notched longitudinal stem 32 and a T-bar 34. Bar 28 may comprise aluminum, stainless steel, plastic, or some other compatible material. A plurality of notches 38 extending from only two opposing sides are spaced along stem 32 so as to facilitate engagement of the notches with slots 24 of both sides 16 and 18 simultaneously. T-bar 34 meets perpendicularly with stem 32 and exhibits an inner surface 35 and an outer surface 37. Stem 32 may be any desirable length enabling bar 28 to extend to and lock-out one or more switches 31 and 33. Notches 38 are dimensioned such that as they engage slots 24, bar 28 is precluded from transverse movement relative to channel 14. Stem 32 of bar 28 enters channel 14 through larger dimensional rectangle 25 of slot 24, and may move toward channel base 20 to engage notches 38 with smaller rectangular dimension 27 of slots 24. Once notches 38 of stem 32 engage slot 24, transverse movement of bar 28 is precluded. Bar 28 may be arranged in slots 24 such that T-bar 34 is in close proximity to one or more switches 31 and 33, preventing the toggling of the switches from either "ON" to "OFF" or "OFF" to "ON".

FIG. 6 shows a locking-bar holder 50 in accordance with the present invention. Locking-bar holder 50 may be mounted inside panel 11 to store any number of locking bars, for example locking bars 26 and 28, when not in use. Locking-bar holder 50 is affixed to panel 11 by adhesive or screws. Locking-bar holder 50 comprises plastic or some other relatively flexible material with multiple channels 52 cut from a substantially rectangular piece as shown in FIG. 8. Channels 52 are spaced such that each channel can secure a locking-bar 26 or 28 inside panel 11 for future use. Each channel 52 exhibits pair of teats 53 that secure bars 26 and 28 in position until needed. FIG. 1 shows locking-bar holder 50 securing bars 26 and 28 in place.

It will be understood that any number of locking bars 26 and 28 may be used simultaneously to lock-out switches 30 in panel 11, however, operating the Power Blocking Circuit Breaker Locking Device assembly employing bar 26 may be described as follows. Channel 14 is attached to panel 11 adjacent a bank of toggle switches 12. The attachment may be accomplished with screws or rivets that extend through panel 11 and channel base 20. The attachment may also be accomplished by adhesive. Bar holder 50 is also attached by mechanical means or by adhesive, in a position within panel 11 so as not to interfere with the operation of the toggle switches 30.

When it is desirable to lock-out a particular toggle switch to open a circuit and de-energize the equipment associated with the particular switch, that is prevent the flow of current to the associated device, lock-out bar 26 is removed from its position in locking-bar holder 50 and inserted transversely to channel 14 into slots 24. Stem 32 of bar 26 extends through sides 16 and 18 of channel 14. Bar 26 is maneuvered within slots 24 until C-shape 36 of bar 26 encloses three sides of switch 30. If it is desirable to lock-out switch 30 in the "OFF" position, side 40 of C-shape 36 is positioned adjacent the switch and stem 32 engages slots 24. Shank 47 of padlock 46 is inserted into slots 24 through larger rectangular dimension 25 of the slots. Shank 47 extends through slots 24 of both side 16 and 18 and ensures that notches 38 of bar 26 remain engaged with slots 24 to prevent any movement of the bar. With bar 26 engaged with slots 24 and C-shape 36 adjacent the desired switch 30, switch 30 cannot be inadvertently closed to re-energize the circuit. The equipment associated with switch 30 can then be maintained or serviced without the risk of injury due to an unexpected re-energization.

In the alternative, padlockable closed-door bar 48 may be positioned within larger dimensional rectangle 25 of slots 24 to prevent the disengagement of bar 26 with slots 24. Closed-door bar 48 shown in FIGS. 1, 8, 9, and 10, is a rectangular piece with a toe 54 extending perpendicularly from one end as shown in FIG. 9. Bar 48 may be made of aluminum, stainless steel, plastic, or some other compatible material. Closed-door bar 48 exhibits a hole 58 bored therethrough, opposite the toe 54 end as shown in FIG. 8. Hole 58 facilitates locking closed-door bar 48 with a smaller padlock 49, for example a ⅛ inch American Series B20 padlock. FIG. 10 shows a cross-section of bar 48, which is substantially similar to larger rectangular dimension 25 of slots 24 nearest the free edges of sides 16 and 18. The cross section of bar 48 is such that it accomplishes a loose-fit within slots 24 when a bar is engaging the slots. Bar 48 is limited in transverse movement with respect to channel 14 by toe 54 on one end and padlock 49 on the other such that with the padlock shank locked through hole 58, the insert cannot be removed from the slots. Closed-door bar 48 and small padlock 49 are shallow enough to allow the panel door of a circuit breaker box to be closed.

Bar 26 can also be positioned to lock-out a circuit breaker switch in the "ON" position. It may be preferable, for example, to protect the power supply to critical computer systems, security systems, or other sensitive equipment by locking associated circuit breakers "ON" and thus prevent inadvertent interruption. To accomplish the task of locking switch 30 "ON", C-shape 36 of bar 26 encloses switch 30 on three sides, with side 42 of C-shape 26 positioned adjacent switch 30. Notches 38 engage slots 24 to prevent lateral movement. For safety reasons padlock 46 is not used, however, closed-door bar 48 may be inserted with a wire tag instead of a lock to prevent accidental removal. Bar 26 is thus precluded from movement transversely across channel 14 and the closed circuit is maintained until the wire tag and closed-door bar 48 are removed.

Operating the Power Blocking Circuit Breaker Locking Device assembly employing bar 28 may be described as follows. Channel 14 is attached to panel 11 adjacent a bank of toggle switches 12. The attachment may be accomplished with screws or rivets through panel 11 and channel base 20. The attachment may also be accomplished by adhesive. Bar holder 50 is also adhesively attached in a position within panel 11 so as not to interfere with the operation of toggle switches 31 and 33. When it is desirable to lock-out a particular toggle switch to open a circuit and interrupt current to the equipment or device associated with the particular switch, lock-out bar 28 is removed from its position in lock bar holder 50 and inserted transversely to channel 14 into slots 24. Stem 32 of bar 28 extends through sides 16 and 18 of channel 14. Bar 28 is maneuvered within slots 24 until T-bar 34 of bar 28 is adjacent switches 31 and 33. Bar 28 may lock-out one or more switches in the same position, for example, bar 28 may lock-out two switches in the "ON" position or two switches in the "OFF" position. If it is desirable to lockout switches 31 and 33 in the "OFF" position, T-bar 34 is positioned adjacent the switches with outer surface 37 of T-bar 34 nearest the switches. Stem 32 engages slots 24 when bar 28 is in the desired position. Shank 47 of padlock 46 is inserted into slots 24 through larger rectangular dimension 25 of the slots such that the shank extends through both sides 16 and 18. Padlock 46 ensures that notches 38 of bar 28 remain engaged with slots 24 to prevent any movement of the bar. With bar 28 engaged with slots 24 and T-bar 38 adjacent the desired switches 31 and 33, the switches cannot be inadvertently or purposely closed to re-energize the circuit. The equipment associated with switches 31 and 33 can then be maintained or serviced without the risk of injury due to an unexpected re-energization. In the alternative, closed-door bar 48 may be positioned in the larger dimensioned rectangle of slots 24 to prevent the disengagement of bar 28 with slots 24. The use of insert 48 with bar 28 is substantially the same as the use of insert 48 with bar 26 described above.

Bar 28 can also be positioned to lock-out a circuit breaker switch in the "ON" position. To accomplish the task of locking switches 31 and 33 "ON", T-bar 34 is positioned adjacent the switches with surface 35 of T-bar 34 nearest the switches. Notches 38 engage slots 24. Padlock 46 is not used in slots 24 due to current safety regulations. Bar 28 is thus precluded from movement transversely across channel 14 and the closed circuit will be maintained until bar 28 is removed. Closed door bar 48 may also be used to lock bar 28 in engagement with slots 24.

Figure 12:
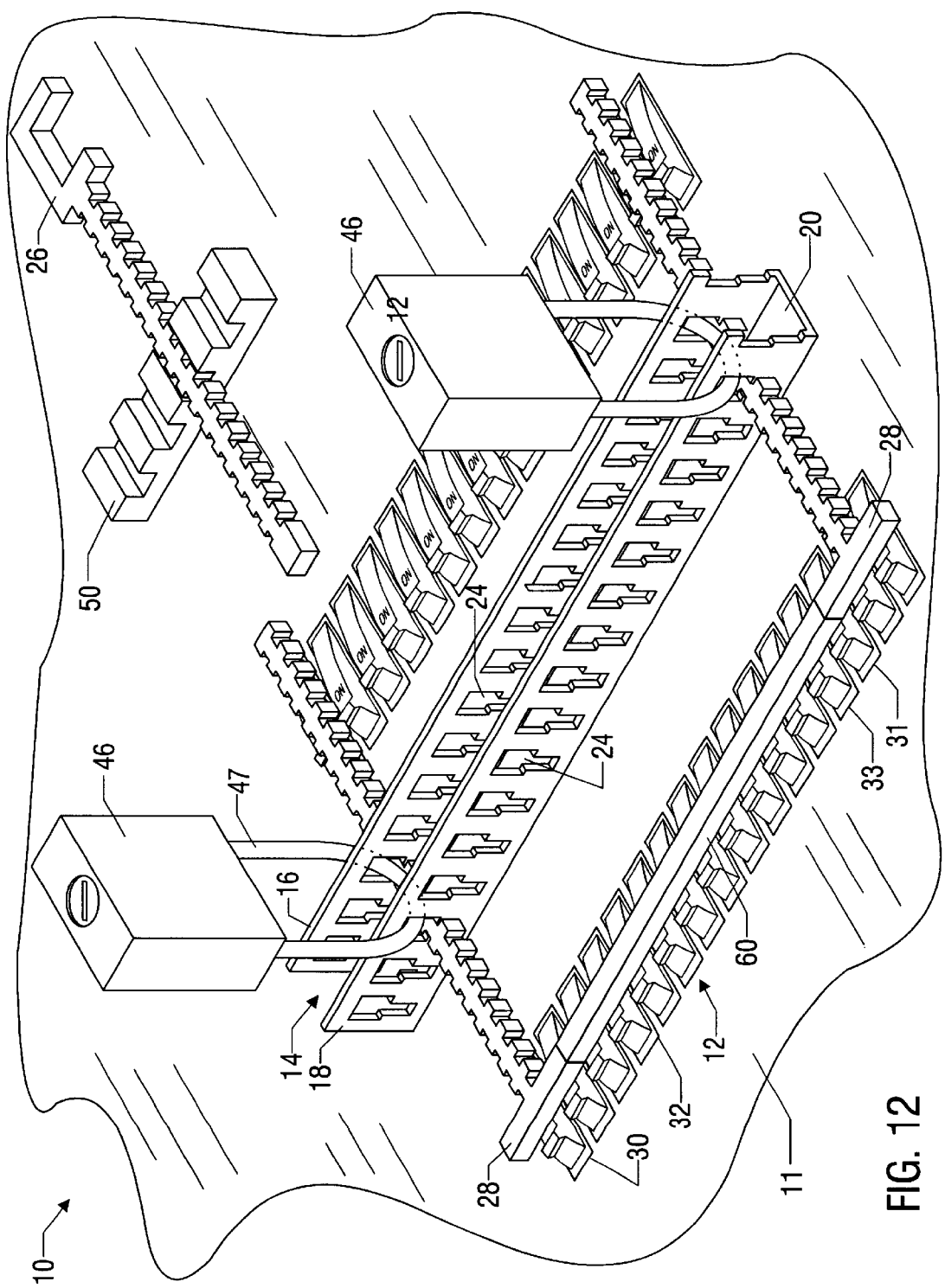
FIG. 12 is a perspective view of the Power Blocking Circuit Breaker Locking Device employing the extension bar.

If it becomes desirable to lock-out several consecutive circuit breakers in the same column in the same position, an extension bar 60 can be employed to minimize the number of padlocks necessary. Extension bar 60 comprises a rectangular bar of aluminum, stainless steel, plastic, or some other material that may be hollow at each end and engagable with T-bar 34 of bar 28. To lock-out multiple consecutive breakers in a single column, extension bar 60 is placed between two T-bars 34 as shown in FIG. 12. The two bars 28 associated with T-bars 34 are then positioned and locked within slots 24 of channel 14 in the same manner described above. The T-bars 34 and extension bar 60 are positioned adjacent the bank of switches 12 such that the switches are precluded from toggling.

While the present invention has been particularly shown and described with reference to various illustrative embodiments thereof, it will be understood by those skilled in the art that various changes in form and details may be made without departing from the spirit and scope of the invention. The above-described embodiments are intended to be merely illustrative, and should not be considered as limiting the scope of the present invention.

What is claimed is:

1. A Power Blocking Circuit Breaker Locking Device for locking out electrical circuits comprising:

a channel including a pair of opposed side walls;

a plurality of longitudinally spaced, closed slots lateral to said channel and transversely aligned in spaced pairs, each said spaced pair including one slot in one said side wall and another slot in the opposing side wall;

at least one locking bar substantially longer in its length than a distance between said side walls, said locking bar including a stem having a plurality of spaced longitudinal notches, said longitudinal notches spaced to enable engagement of said slots of a selected slot pair in a plurality of transverse positions;

wherein said slots interlockingly mate with said notches of said locking bar to immobilize said locking bar against movement in the directions parallel and perpendicular to a longitudinal axis of said locking bar wherein a first end of said locking bar extends to a position adjacent a toggle switch to prevent toggling of said switch; and a locking mechanism extending through both said slots of a selected slot pair to prevent disengagement of said notches of said locking bar with said slots.

2. The device of claim 1 wherein said channel is substantially U-shaped.

3. The device of claim 1 wherein said slots are substantially T-shaped.

4. The device of claim 3 wherein said slots include a first rectangular aperture and a second rectangular aperture, said first rectangular aperture being larger than said second rectangular aperture, and wherein said locking bar has a rectangular cross section.

5. The device of claim 4 wherein said locking bar may be inserted into said first rectangular aperture of said slots and freely maneuvered therein.

6. The device of claim 4 wherein said locking bar may engage said second rectangular aperture of said slots, limiting movement of said locking bar in a direction along the longitudinal axis of said bar and limiting movement of said locking bar in a direction along the longitudinal axis of said channel.

7. The device of claim 2 wherein said U-shaped channel further comprises:

a center portion substantially normal to said opposing side walls, said center portion being adapted for mounting to a surface adjacent a circuit breaker switch bank.

8. The device of claim 1 wherein at least one of said side walls is substantially planar.

9. The device of claim 1 wherein at least one of said side walls exhibits an angular bend, such that the tendency of said angular bend is to bring the free longitudinal edge of said side wall exhibiting said angular bend into closer proximity to said opposing side wall.

10. The device of claim 4 wherein said locking mechanism is a padlock extending through said first rectangular aperture of said slots of both said side walls, wherein said padlock prevents said locking bar from disengaging with said second aperture of said slots.

11. The device of claim 4 wherein said locking mechanism is a closed-door padlockable bar extending through said first rectangular aperture of said slots of both said side walls, wherein said padlockable bar prevents said locking bar from disengaging with said second aperture of said slots.

12. The device of claim 11 wherein said closed-door padlockable bar comprises:

an elongated bar including a longitudinal axis, a first longitudinal end, a second longitudinal end, and a rectangular crossection substantially similar in shape and dimension to said first aperture;

a toe on said first longitudinal end; and a hole extending through said elongated bar substantially normal to said longitudinal axis at said second longitudinal end.

13. The device of claim 12 wherein said hole is receptive of a padlock.

14. The device of claim 13 wherein said padlock limits transverse movement of said closed-door padlockable bar within said slots.

15. The device of claim 12 wherein said toe limits transverse movement of said closed-door padlockable bar within said slots.

16. The device of claim 12 wherein said closed-door padlockable bar fits loosely within said first aperture of said slots.

17. The device of claim 12 wherein said closed-door padlockable bar is aluminum.

18. The device of claim 1 including a locking bar holder.

19. The device of claim 18 wherein said locking bar holder comprises rectangular block with multiple channels with teats cut therein, each said channel being receptive of a locking bar for storage purposes.

20. The device of claim 18 wherein said locking bar holder includes an elastomeric material.

21. The device of claim 19 wherein said channels are substantially rectangular.

22. The device of claim 1 wherein said channel is aluminum.

23. The device of claim 1 wherein said locking bars is aluminum.

24. A locking bar device for immobilizing a toggle switch, said bar comprising:

a stem with a longitudinal axis, said stem exhibiting a substantially rectangular cross section and a plurality of longitudinally spaced notches within two opposing longitudinal edges of said stem;

an end section coupled to a first end of said stem, and an extension bar engagable between two said bars for use in immobilizing a series of circuit breakers in the same column.

25. Apparatus for locking one or more circuit breakers in a fixed position, the apparatus comprising;

a channel having first and second opposing side walls;

a plurality of closed passages having an upper section and a lower section, the passages extending laterally through a portion of the first and second side walls and substantially aligned in complementary pairs along a longitudinal axis of the channel;

at least one locking member demountably positioned in the lower sections of one of the complementary pairs of passages and adapted to resist lateral movement of the locking member across the channel, and;

an end section coupled to the locking member and engaging at least one of the circuit breakers.

26. The apparatus of claim 25 wherein a portion of the first opposing side wall is angled toward the second opposing side wall.

27. The apparatus of claim 25 further comprising a lock, wherein a shackle of the lock is extended through the upper section of one of the complementary pairs of passages.

28. A system for preventing power resumption to a device, the system comprising:

a circuit breaker panel having a plurality of circuit breakers, at least one of the circuit breakers in an off position whereby current to a device is interrupted;

a U-shaped channel mounted on the circuit breaker panel adjacent the plurality of circuit breakers, and containing at least one aperture;

at least one circuit breaker keeper extended through at least one of the apertures substantially perpendicular to a long axis of the U-shaped channel, said circuit breaker keeper engaging the circuit breaker in an off position to prevent relative movement of the circuit breaker;

a lock positioned through the aperture to restrict removal of the circuit breaker keeper.

* * * * *